(12) United States Patent
Akiba et al.

(10) Patent No.: US 10,103,681 B2
(45) Date of Patent: Oct. 16, 2018

(54) RETAINING DEVICE FOR SOLAR CELL MODULE

(71) Applicant: Solar Frontier K.K., Tokyo (JP)

(72) Inventors: Toshirou Akiba, Tokyo (JP);
Bagwadkar Ninad, Tokyo (JP); Kouji Nasuno, Tokyo (JP)

(73) Assignee: Solar Frontier K.K., Tokyo (JP)

( * ) Notice: Subject to any disclaimer, the term of this patent is extended or adjusted under 35 U.S.C. 154(b) by 0 days.

(21) Appl. No.: 14/760,163

(22) PCT Filed: Dec. 18, 2013

(86) PCT No.: PCT/JP2013/083967
§ 371 (c)(1),
(2) Date: Jul. 9, 2015

(87) PCT Pub. No.: WO2014/109194
PCT Pub. Date: Jul. 17, 2014

(65) Prior Publication Data
US 2015/0357965 A1 Dec. 10, 2015

(30) Foreign Application Priority Data

Jan. 11, 2013 (JP) ................................ 2013-003894

(51) Int. Cl.
*H01L 31/00* (2006.01)
*H02S 20/23* (2014.01)
(Continued)

(52) U.S. Cl.
CPC .............. *H02S 20/23* (2014.12); *F24S 25/13* (2018.05); *F24S 25/35* (2018.05); *F24S 25/632* (2018.05);
(Continued)

(58) Field of Classification Search
CPC ........ F24J 2/5207; F24J 2/5233; F24J 2/5254; H02S 2/23; H02S 2/24; H02S 20/23;
(Continued)

(56) References Cited

U.S. PATENT DOCUMENTS

| 2010/0065108 A1* | 3/2010 | West | F24J 2/5211 |
| | | | 136/251 |
| 2013/0136531 A1* | 5/2013 | Kobayashi | F24J 2/5207 |
| | | | 403/326 |

FOREIGN PATENT DOCUMENTS

| JP | 11-62145 | 3/1999 |
| JP | 11-247378 | 9/1999 |

(Continued)

OTHER PUBLICATIONS

International Search Report dated Jan. 21, 2014, directed to International Application No. PCT/JP2013/083967, 2 pages.
(Continued)

*Primary Examiner* — Uyen M Tran
(74) *Attorney, Agent, or Firm* — Morrison & Foerster LLP

(57) ABSTRACT

A fastening system fastening solar cell modules to an installation surface, each solar cell module having a top surface at which a solar cell substrate is provided, a bottom surface at the opposite side to the top surface, a first side part, and a second side part at the opposite side to the first side part, the fastening system comprising a plurality of support members which abut against the first side parts or the second side parts of the solar cell modules, the plurality of support members supporting the bottom surfaces and the first side parts and the second side parts of the solar cell modules, and fastening members which prevent at least vertical movement of the solar cell modules with respect to
(Continued)

top surfaces, the fastening members being movably attached to the plurality of support members, is provided.

4 Claims, 24 Drawing Sheets

(51) Int. Cl.
| | | |
|---|---|---|
| *H02S 20/24* | (2014.01) | |
| *F24S 25/632* | (2018.01) | |
| *F24S 25/35* | (2018.01) | |
| *F24S 25/13* | (2018.01) | |
| *F24S 25/00* | (2018.01) | |
| *F24S 25/60* | (2018.01) | |

(52) U.S. Cl.
CPC ......... *H02S 20/24* (2014.12); *F24S 2025/014* (2018.05); *F24S 2025/6002* (2018.05); *Y02B 10/12* (2013.01); *Y02E 10/47* (2013.01)

(58) Field of Classification Search
CPC . H02S 20/24; F24S 25/13; F24S 25/35; F24S 25/362; F24S 2025/6002; F24S 2025/014; Y02E 10/47; Y02B 10/12
See application file for complete search history.

(56) References Cited

FOREIGN PATENT DOCUMENTS

| | | |
|---|---|---|
| JP | 11-270085 | 10/1999 |
| JP | 2008-95418 | 4/2008 |
| JP | 3152208 | 7/2009 |
| JP | 2012-17569 | 1/2012 |
| WO | WO-2012/023306 | 2/2012 |

OTHER PUBLICATIONS

Extended Search Report and Office Action dated Nov. 8, 2016, directed towards EP Application No. 13870897.9; 8 pages.

\* cited by examiner

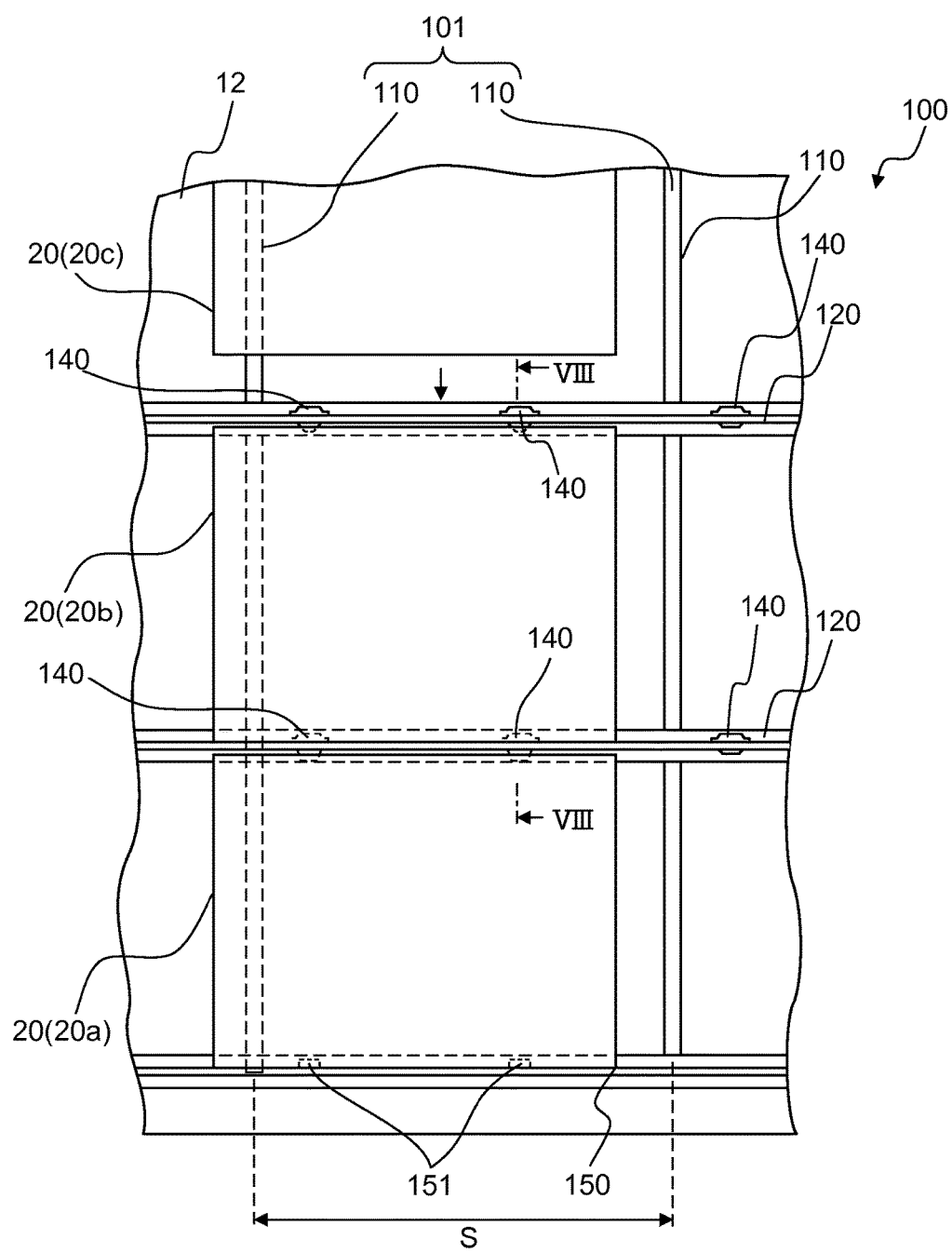

RETAINING DEVICE FOR SOLAR CELL MODULE

CROSS-REFERENCE TO RELATED APPLICATIONS

This application is a U.S. National Phase patent application of International Patent Application No. PCT/JP2013/083967, filed on Dec. 18, 2013, which is hereby incorporated by reference in the present disclosure in its entirety.

FIELD OF THE INVENTION

The present invention relates to a fastening system which fastens solar cell modules to an installation surface of a roof or the like.

BACKGROUND OF THE INVENTION

In recent years, due to the interest in the environment and government policies etc., solar cells are being increasingly installed at public facilities, general homes, and all sorts of other locations. Solar cells utilize sunlight, so are installed on roofs or rooftops or other outside locations, but to make effective utilization of the installable area, the practice is often to arrange a plurality of solar cell modules to form an array of a group of solar cells.

Solar cell modules are installed on installation surfaces of roofs or rooftops etc., so have to be strongly fastened to the installation surfaces using fastening systems so that they will not be blown off due to the wind or rain etc. On the other hand, the practice has been to reduce the number of members which form the fastening systems and fabricate the fastening systems at lower cost. Further, solar cell modules are installed on slanted roofs and other hazardous places, so the installation work is preferably as simple as possible.

Patent document 1 has as its object the use of standardized parts for the various shapes, dimensions, or materials of roofs when installing solar cell modules on the roofs of housing and describes a frame structure for fastening solar cell modules which is comprised of vertical members which use a plurality of vertical member parts comprised of a plurality of types of light weight steel C shapes of at least large, medium, and small different lengths and connect these by vertical member connecting fittings to form predetermined lengths, horizontal members which use a plurality of horizontal member parts comprised of a plurality of types of light weight steel C shapes of at least large, medium, and small different lengths and connect these by horizontal member connecting fittings to form predetermined lengths, tile fittings which fasten the vertical members to tiles, vertical/horizontal member fasteners which fasten the vertical members and horizontal members, and solar cell module fasteners which fasten the solar cell module to horizontal members.

The solar cell module fastener which is used in the frame structure for solar cell modules of Patent document 1 is comprised of a lid part and a horizontal member engagement part. The end part of a solar cell module is clamped by the lid part and horizontal member engagement part then the lid and horizontal member engagement part are fastened by a bolt to thereby fasten the solar cell module to a horizontal member. For this reason, when installing solar cell modules at the frame structure, for example a step of fastening bolts was necessary.

PRIOR ART DOCUMENT

Patent document 1: Japanese Patent Publication No. 11-247378A

SUMMARY OF THE INVENTION

It is desirable to reduce the number of parts of a fastening system which fastens solar cell modules to an installation surface and improve the work efficiency at the time of installing solar cell modules at the fastening system.

The aspect of the invention provides a fastening system which fastens solar cell modules to an installation surface, each solar cell module having a top surface at which a solar cell substrate is provided, a bottom surface at the opposite side to the top surface, a first side part, and a second side part at the opposite side to the first side part, the fastening system comprising a plurality of support members which abut against the first side parts or the second side parts of the solar cell modules, the plurality of support members supporting the bottom surfaces, the first side parts, and the second side parts of the solar cell modules, and fastening members which prevent at least vertical movement of the solar cell modules with respect to the top surfaces, the fastening members being movably attached to the plurality of support members so that the lock against movement of the solar cell modules can be released.

The aspect of the invention provides a fastening system wherein the fastening members are attached to the support members to be able to rotate about axes parallel to the first side parts and second side parts of the solar cell modules.

The aspect of the invention provides a fastening system wherein the fastening members are attached to the support members to be able to rotate about axes vertical to the top surfaces of the solar cell modules.

The aspect of the invention provides a fastening system wherein the solar cell modules are formed with insertion holes at the first side parts or the second side parts which are supported by the support members, and the fastening members are provided with engagement pieces which are inserted into the insertion holes of the solar cell modules and prevent movement of the solar cell modules.

The aspect of the invention provides a fastening system wherein the fastening members are provided with engagement pieces which abut against the top surfaces of the solar cell modules to prevent movement of the solar cell modules.

The aspect of the invention provides a fastening system further comprising anti-movement members which are attached to the support members which prevent movement parallel to the first side parts and the second side parts of the solar cell modules.

The aspect of the invention provides a fastening system which fastens a plurality of the solar cell modules which are arranged consecutively, wherein the support members support the bottom surfaces of the solar cell modules which adjoin each other across the support members and one the first side part and another second side part among the adjoining solar cell modules, and the fastening members prevent movement of both adjoining solar cell modules in a vertical direction with respect to the top surfaces of the solar cell modules.

The aspect of the invention provides a fastening system wherein the fastening members are attached to the support members to be able to rotate about axes parallel to the first side parts and the second side parts.

The aspect of the invention provides a fastening system wherein the fastening members are attached to the support members to be able to rotate about axes vertical to the top surfaces of the solar cell modules.

The aspect of the invention provides a fastening system, wherein the solar cell modules which adjoin each other across the support members are formed with insertion holes at the first side parts and the second side parts which are supported by the support members, and the fastening members are provided with first engagement pieces which are inserted into the insertion holes of one of the solar cell modules which adjoin each other and second engagement pieces which are inserted into the other insertion holes.

The aspect of the invention provides a fastening system wherein the fastening members are provided with first engagement pieces which abut against the top surface of one of the solar cell modules which adjoin each other across the support members and second engagement pieces which abut against the other top surface.

The aspect of the invention provides a fastening system further provided with anti-movement members which are attached to the support members and which prevent movement parallel to the first side parts and the second side parts of the solar cell modules.

The aspect of the invention provides a fastening system further comprising a frame structure which fastens the plurality of support members to the installation surface.

The fastening system of solar cell modules according to the present invention uses support members which support bottom surfaces, first side parts, and second side parts of solar cell modules and fastening members which prevent movement in a vertical direction with respect to the top surfaces of the solar cell modules to fasten solar cell modules. In the past, as described for example in PLT 1, separate from the horizontal members, bolted lids and horizontal member connecting parts were used, but in the fastening system of the present invention, the support members and the fastening members are used to fasten the solar cell modules so it is possible to cut the number of parts of the fastening system. Further, by attaching the fastening members to the support members to be able to move, it is possible to place the support members on the installation surface, release the lock on movement of the solar cell modules, then in that state place the solar cell modules and again make the fastening members move to return them to their original positions so as to fasten the solar cell modules to the fastening system. For this reason, after installing the fastening system on the installation surface, it is possible to fasten the solar cell modules without bolting work and the work efficiency when installing the solar cell modules at the fastening system is improved.

BRIEF DESCRIPTION OF THE DRAWINGS

FIG. 2 is a plan view of a fastening system according to the present embodiment.

Figure 1:
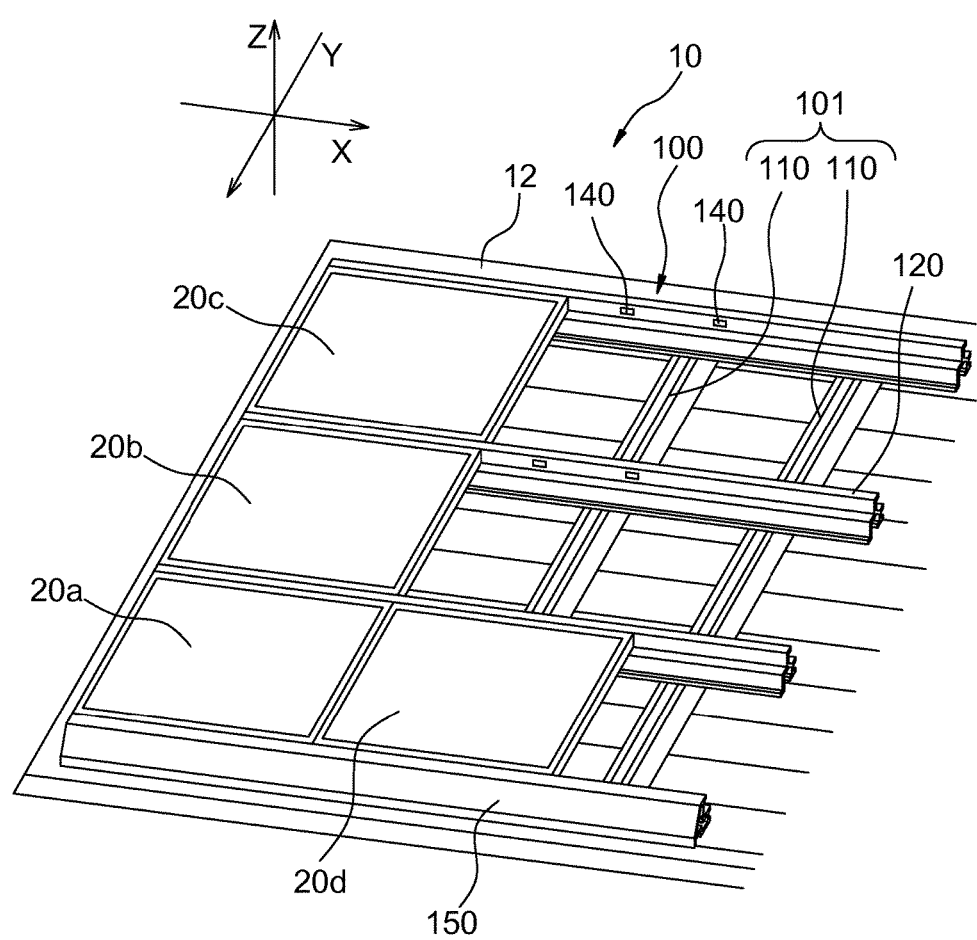
FIG. 1 is a perspective view which shows a fastening system of solar cell modules according to one embodiment of the present invention.

Below, referring the attached drawings, embodiments of the present invention will be explained. In the following embodiments, the same or similar component elements will be assigned common reference numerals. To facilitate understanding, the drawings will be suitably changed in scale. Further, note that the technical scope of the present invention is not limited to these embodiments and includes inventions which are described in the claims and their equivalents.

FIG. 1 is a perspective view which shows a fastening system 100 according to a first embodiment of the present invention which fastens solar cell modules 20a to 20d (below sometimes referred to all together as the "solar cell modules 20") on the installation surface of a roof 10, while FIG. 2 is a plan view which shows part of the fastening system 100. As shown in FIG. 1 and FIG. 2, the plurality of solar cell modules 20 are arranged consecutively in the vertical direction and horizontal direction of the installation surface 12 and are fastened by the fastening system 100. In the Description, as shown in FIG. 1, the slanted direction of the installation surface 12 of the roof 10, the direction from the inclined top side to the inclined bottom side, the direction from the ridge side to the eave side, and the arrow Y-direction of FIG. 1 will be referred to as the "vertical direction", the direction of extension of the roof of the roof 10 and the arrow X-direction of FIG. 1 will be referred to as the "horizontal direction", and upward direction vertical to the installation surface 12 and the arrow Z-direction of FIG. 1 will be referred to as the "top direction". Note that, FIG. 1 shows the later explained installation surface 12 and frame structure 101 and the support members 120, so part of the solar cell modules 20 is omitted.

Figure 14:
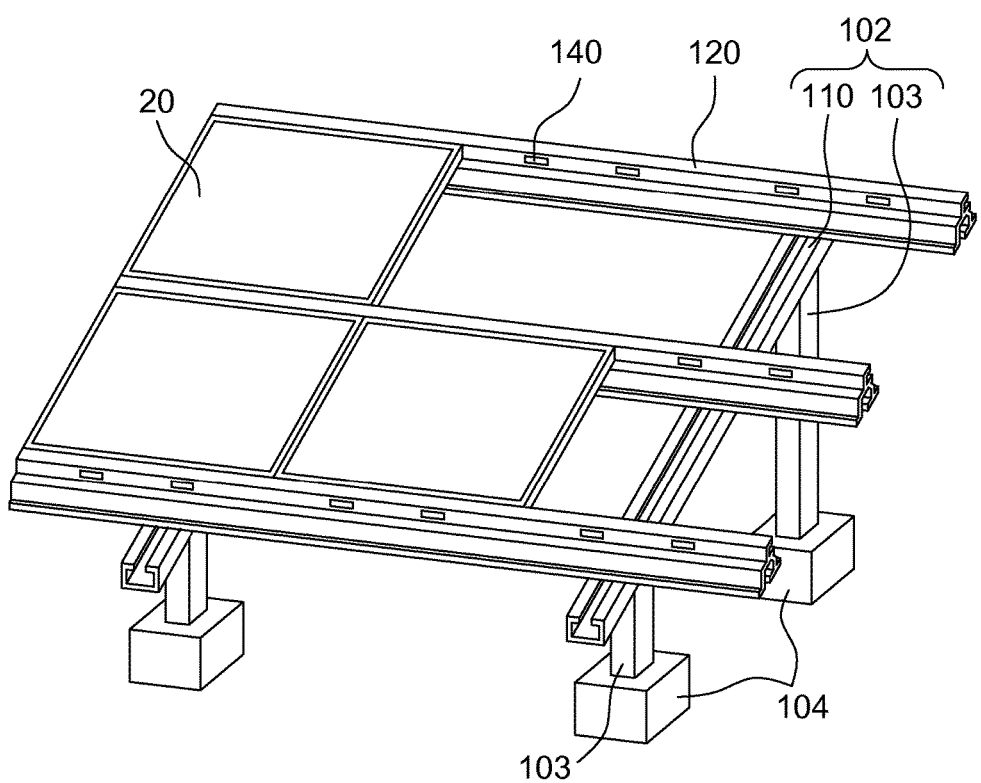
FIG. 14 is a perspective view which shows another example of a fastening system according to the present embodiment.

The fastening system 100 of the present embodiment is comprised of a frame structure 101, a plurality of narrow support members 120 which are fastened to the frame structure 101, and fastening members 140 which are attached to the support members 120 and fasten the solar cell modules 20. The frame structure 101 of the present embodiment is comprised of a plurality of narrow vertical members 110 which are arranged along the vertical direction of the installation surface 12 so as to become parallel with each other. Further, the support members 120 bridge the vertical members 110 and are arranged along the horizontal direction of the installation surface 12 so are referred to as "horizontal members". Note that, the frame structure 101 is comprised of a plurality of vertical members 110 which are directly attached to the installation surface of the roof, but the configuration of the frame structure 101 is not limited to this. For example, as shown in FIG. 14, the frame structure 102 (corresponding to frame structure 101) may further support the vertical members 110 by support columns 103 so that the vertical members 110 are slanted. Further, the installation surface on which the solar cell modules are installed is not limited to the roof surface of a slanted roof. The modules may also be installed on the roof surface of a flat roof.

Figure 3A:
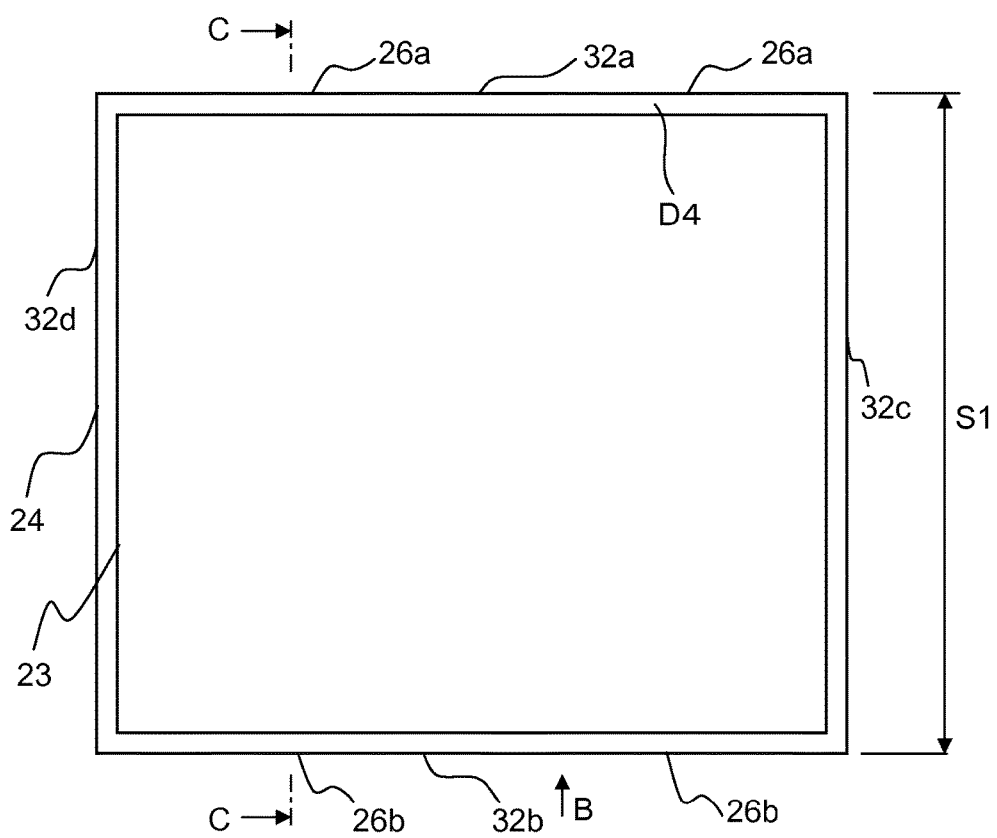
FIG. 3A is a plan view of a solar cell module.
Figure 3B:
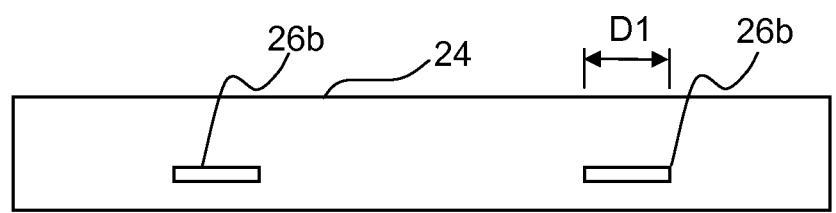
FIG. 3B is a side view which shows a solar cell module as seen from an arrow B direction of FIG. 3A.
Figure 3C:
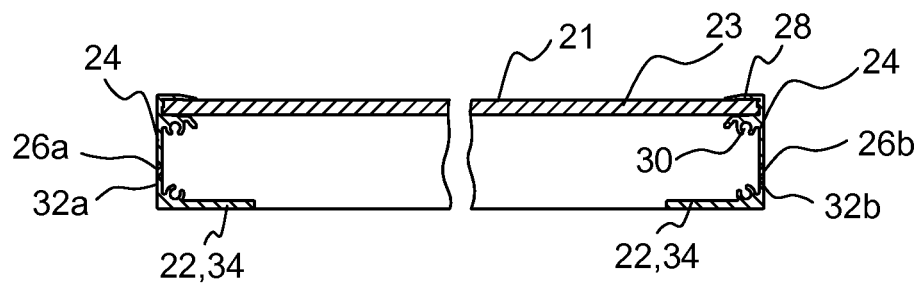
FIG. 3C is a cross-sectional view along the line C-C of FIG. 3A.

The solar cell modules 20 which are fastened by the fastening system 100 of the present embodiment will be explained. FIG. 3A to FIG. 3C are views which show a solar cell module 20. FIG. 3A is a plan view, FIG. 3B is a side view seen from the arrow B direction of FIG. 3A, and FIG. 3C is a cross-sectional view along the line C-C of FIG. 3A. The solar cell module 20, as shown in FIG. 3A and FIG. 3C, is comprised of a hollow framework shaped frame 24 and a solar cell substrate 23 which is attached to the inside of this frame 24. The solar cell substrate 23 is a board which is provided with a solar cell element which generates power by receiving light and suitably has cover glass etc. which protects this solar cell element laid over it. The solar cell element which is used in this embodiment may be any of a silicon crystal-based (monocrystalline silicon or polycrystalline silicone), amorphous-based (amorphous silicon), compound-based (CIS, CdTe, GaAs, etc.), organic-based solar cell element, etc. The type is not particularly limited.

The frame 24 is a frame which holds the solar cell substrate 23 and protects the multilayer end faces and is a member made of aluminum or another metal. This frame 24 is comprised of four strut shaped frame component members with end parts which are connected with each other at right angles and is formed into a longitudinal shape matching the outer circumferential shape of the solar cell substrate 23.

The frame 24, as shown in FIG. 3C, is formed from top surface side clamping parts 28 which clamp the solar cell substrate 23 from the top surface side, bottom surface side clamping parts 30 which clamp the solar cell substrate 23 from the bottom surface side, plate shaped side parts 32a to 32d (below sometimes referred to all together as the "side parts 32") which extend from the end parts of the top surface side clamping parts 28 and bottom surface side clamping parts 30 to the bottom side and form side surfaces of the solar cell module 20, and plate-shaped base parts 34 which extend from the bottom end parts of the side parts 32 bent to the inside of the frame 24 at right angles to form the bottom surface of the solar cell module 20. Below, when fastening the solar cell module 20 to the installation surface 12 of the roof 10, the side part 32 which is positioned at the ridge side and inclined top side of the roof 10 will be referred to as the "first side part 32a", the side part which is positioned at the eave side and inclined bottom side of the roof will be referred to as the "second side part 32b", the side part which is positioned at the right side toward FIG. 3 will be referred to as the "right side part 32c", and the side part which is positioned at the left side will be referred to as the "left side part 32d". Further, the surface at which the solar cell substrate 23 is arranged will be referred to as the "top surface 21" of the solar cell module 20, while the bottom of the base part 34 of the frame 24 will be referred to as the "bottom surface 22" of the solar cell module 20.

Further, the first side part 32a of the solar cell module 20 of the present embodiment is formed with insertion holes 26a in which first engagement pieces 142 of fastening members 140 which are attached to the later explained support members 120 is formed, while the second side part 32b is formed with insertion holes 26b in which second engagement pieces 143 of the fastening members 140 are inserted (below, the insertion holes 26a, 26b sometimes being referred to all together as the "insertion holes 26").

The plurality of the vertical members 110 of the frame structure 101, as shown in FIG. 1 and FIG. 2, are arranged on the installation surface 12 of the roof 10 along the inclined direction of the roof 10 (vertical direction) in parallel. They are narrow members which are fastened by bolts etc. to the installation surface 12 and are designed to fasten the later explained support members 120. The interval of arrangement S of the vertical members 110 may be any interval, but usually the vertical members 110 are fastened to the rafters of the roof 10, so are arranged matched with the intervals of the rafters.

Figure 4A:
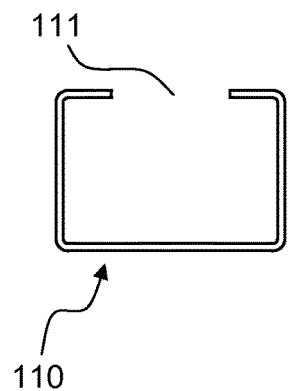
FIG. 4A is a view which shows the cross-sectional shape of a vertical member.
Figure 4B:
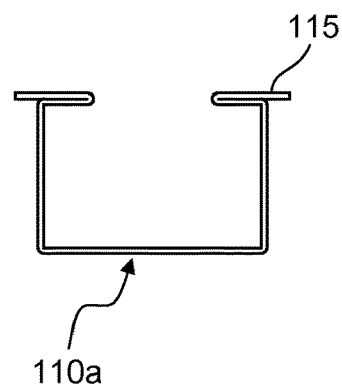
FIG. 4B is a view which shows another example of the cross-sectional shape of a vertical member.
Figure 4C:
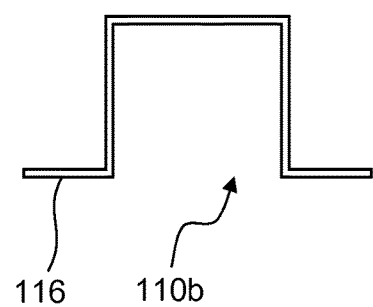
FIG. 4C is a view which shows another example of the cross-sectional shape of a vertical member.

The vertical members 110 are for example formed by galvanized steel sheets. A vertical member 110 of the present embodiment, as shown in FIG. 4A, is formed into a narrow hollow columnar shape with a square cross-section which is open at the top surface. The vertical member 110 is formed with bolt holes at the bottom surfaces so as to be fastened to the installation surface 12 of the roof 10. By inserting and fastening bolts, it is fastened to the installation surface 12. The cross-sectional shape of the vertical member 110, for example, as shown in FIG. 4B, may have flange parts 115 which extend to the outside for broadening the area of the top surface of the vertical member 110a which contacts the support member 120. Further, as shown in FIG. 4C, the cross-sectional shape of the vertical member 110b may also be a hat shape which has a bottom surface which is opened and has a bottom end part which has flange parts 116 which extend to the outside. The cross-sectional shape of the vertical member 110 are not particularly limited. In the case of the cross-sectional shape which is shown in FIG. 4C, the top surface of the vertical member 110b is formed with the bolt holes for fastening a support member 120.

Figure 5A:
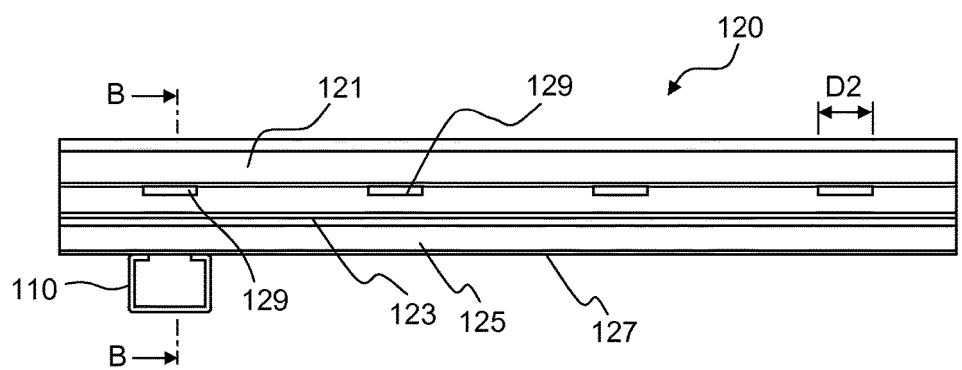
FIG. 5A is a side view of a support member (horizontal member) which is used in the fastening system of the present embodiment.
Figure 5B:
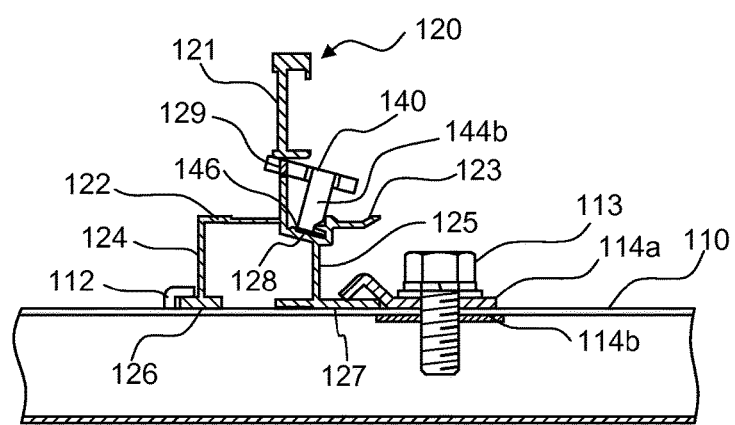
FIG. 5B is a cross-sectional view of a support member along the line B-B of FIG. 5A and shows the state where a fastening member is attached and is fastened to a frame structure (vertical member).

Next, the support members 120 of the fastening system 100 of the present embodiment will be explained. FIG. 5A is a side view which shows part of a support member 120. Further, FIG. 5B is a cross-sectional view along the line B-B of FIG. 5A and shows the state of being fastened to a vertical member 110 of the frame structure 101 and attachment of a later explained fastening member 140.

The support members 120 are members which are arranged consecutively in the vertical or horizontal direction of the installation surface 12 and support the solar cell modules and are formed so as to abut against and support the bottom surfaces 22 of the solar cell modules 20 which adjoin each other in the vertical direction, that is, the edge parts of the bottoms of the base parts 34, and the first side parts 32a and the second side parts 32b. A support member 120 of the present embodiment is provided with a first bottom surface support part 122 which supports a bottom surface of the solar cell module 20a which is positioned at the inclined bottom side among the solar cell modules 20a and 20b which adjoin each other in the vertical direction (see FIG. 2), a second bottom surface support part 123 which supports a bottom surface of the solar cell module 20b which is positioned at an inclined top side, and a side part support part 121 which is positioned between a first side part of the solar cell module 20a and a second side part of the solar cell module 20b and which supports the first side part of the solar cell module 20a and the second side part of the solar cell module 20b. Further, between the bottom end of the side part support part 121 of the support member 120 and the second bottom surface support part 123, a groove part 128 in which the leg parts 144a, 144b of the later explained fastening member 140 are inserted is formed. Note that, the groove part 128 has an inclined bottom surface such as shown in FIG. 5B so that when the fastening member 140 is inserted, the fastening member 140 is inclined at a slant. Further, the support member 120 has a standing part 124 which supports the first bottom surface support part 122 and a standing part 125 which supports the second bottom surface support part 123. At the bottom ends of the standing part 124 and standing part 125, the bottom surface parts 126 and 127 are provided.

At the side part support part 121 of the support member 120, a plurality of through holes 129 in which the first engagement pieces 142 of the fastening members 140 can be inserted are formed matching the positions of the insertion holes 26 which are formed at the first side part 32a and the second side part 32b of the solar cell module 20.

Figure 6:
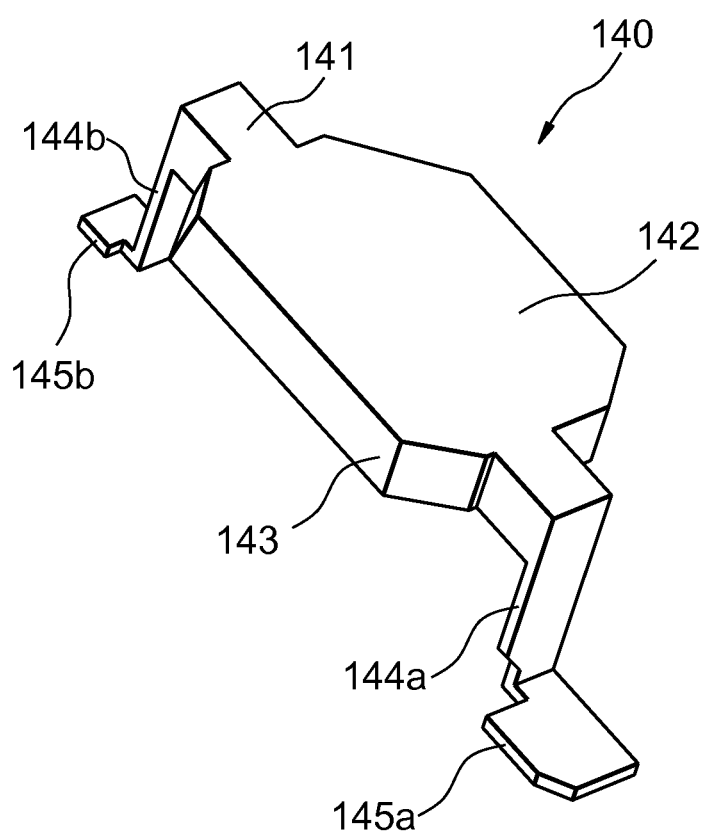
FIG. 6 is a perspective view which shows a fastening member which is used in the fastening system of the present embodiment.
Figure 7A:
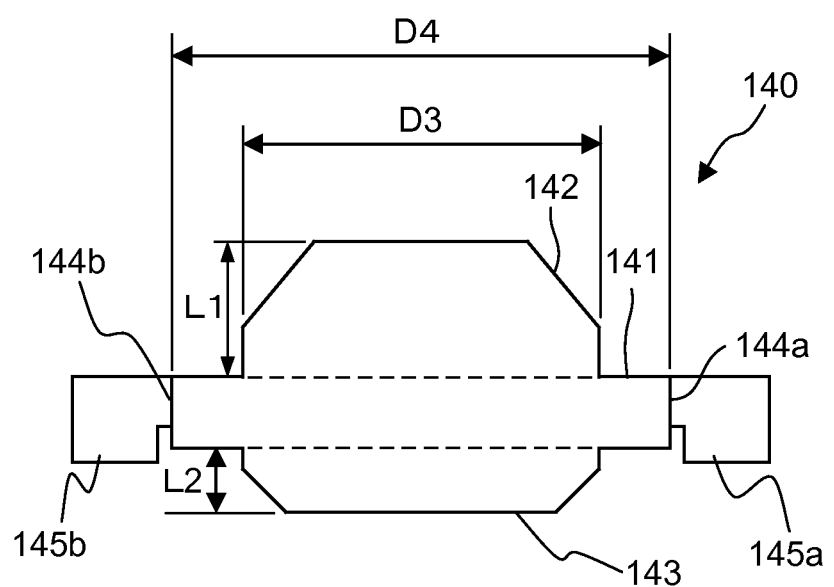
FIG. 7A is a plan view of the fastening member.
Figure 7B:
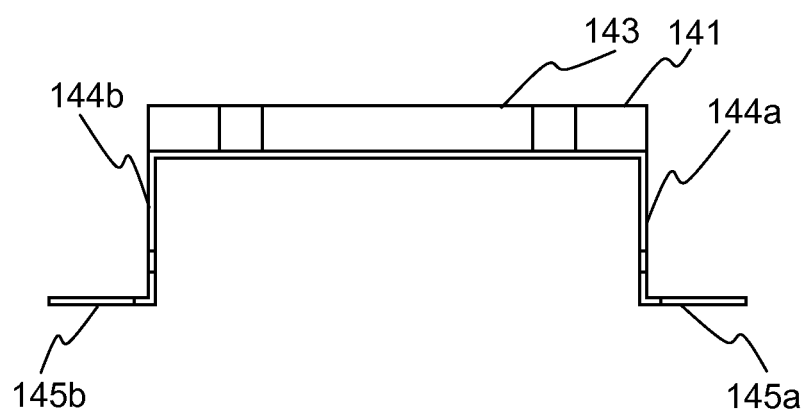
FIG. 7B is a front view of the fastening member.
Figure 7C:
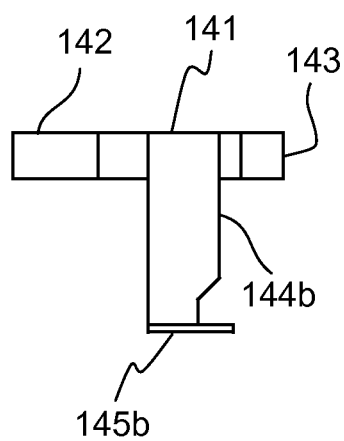
FIG. 7C is a side view of the fastening member.

The fastening members 140 will be explained. FIG. 6 is a perspective view of a fastening member 140, while FIG. 7A to FIG. 7C are three views of the fastening member 140, where FIG. 7A is a plan view, FIG. 7B is a front view, and FIG. 7C is a side view. A fastening member 140 is a member which prevents movement of a solar cell module 20 in at least the top direction. By insertion into the groove part 128 of a support member 120, it is attached to be able to rotate about a rotation center axis 146 of an axis parallel to the longitudinal direction of the support member and parallel to the first side part 32a and the second side part 32b of the solar cell module 20 (see FIG. 5B).

The fastening member 140 is provided with a fastening part body 141, a first engagement piece 142 which extends from one side part of the fastening part body 141 to the outside, and a second engagement piece 143 which extends from the other side part in the opposite direction to the first engagement piece 142. Further, from the two end parts of the fastening part body 141, leg parts 144a, 144b which extend downward are provided. At the bottom ends of the leg parts 144a, 144b, bent parts 145a, 145b are formed. The fastening member 140 of the present embodiment is made of metal and is formed by working steel. It may also be fabricated by other materials, for example, a ceramic or plastic. the other material is not particularly limited.

The first engagement piece 142 passes through a through hole 129 of the support member 120, is inserted in an insertion hole 26a which is formed at the first side part 32a of the solar cell module 20a which is arranged at the inclined bottom side across the support member 120, and thereby prevents movement of the first side part 32a of the solar cell module 20a. The second engagement piece 143 is inserted in an insertion hole 26b of the second side part 32b of the solar cell module 20b which is positioned at the inclined top side across the support member 120 and prevents movement of the second side part 32b of the solar cell module 20b (see FIG. 2, FIG. 8A, and FIG. 8B).

A width D3 of the first engagement piece 142 is formed matched with a width D2 of the through hole 129 and a width D1 of the insertion hole 26a so as to be able to be inserted into the through hole 129 and the insertion hole 26a. Further, the end parts of the first engagement piece 142 are cut away as shown in FIG. 7A so as to facilitate insertion into the through hole 129 and insertion hole 26a. Further, the first engagement piece 142 passes through the through hole 129 of the support member 120 and is inserted in the insertion hole 26a of the solar cell module 20, so the length L1 of the first engagement piece 142 is formed longer than the length L2 of the second engagement piece 143 by the amount of depth of the through hole 129. Note that, when a length D4 of the fastening part body 141 is formed longer than the width D3 of the first engagement piece 142 and the first engagement piece 142 is inserted in the through hole 129, the fastening part body 141 abuts against the surroundings of the through hole 129 and stops rotation of the fastening member 140.

The fastening member 140 is attached by insertion of the bottom ends of the leg parts 144a, 144b in the groove part 128 as shown in FIG. 5B at a position where the front end of the first engagement piece 142 can be inserted in the through hole 129 of the support member 120. At this time, the bottom surface of the groove part 128 is inclined, so the fastening member 140 is inclined at a slant in the state with the front end of the first engagement piece 142 hooked in the through hole 129. In this state, the first engagement piece 142 does not completely stick out from the through hole 129 of the support member. For this reason, when a worker installs the solar cell module 20b, the solar cell module 20b can be placed on the support member 120b without the first side part 32a of the solar cell module 20b being hooked on the first engagement piece 142 (see FIG. 8A and FIG. 8B). Further, the fastening member 140 can rotate about the bottom end parts of the leg parts 144a, 144b, that is, about the axis parallel to the longitudinal direction of the support member 120 and parallel to the first side part and the second side part (rotation center axis 146), by insertion of the bottom ends of the leg parts 144a, 144b in the groove part 128. For this reason, the worker can place the solar cell module 20b on the support member 120, then make the fastening member 140 rotate to insert the first engagement piece 142 into the insertion hole 26a of the solar cell module 20b to fasten the solar cell module 20b to the support member 120.

Referring to FIG. 5B, the method of fastening a support member 120 to a vertical member 110 will be explained. In the present embodiment, the vertical member 110 is formed with a hook part 112 which hooks an end part of a bottom surface part 126 of a support member 120. After the bottom surface part 126 of the support member 120 is hooked at the hook part 112, the clamping members 114a, 114b clamp the bottom surface part 127 of the support member 120 and the top surface of the vertical member 110 and a bolt 113 which passes through a slit 111 of the vertical member 110 is fastened for fixing the parts. The bottom surface parts 126 and 127 of the support member 120 may be formed with bolt holes and the support member 120 fastened to the vertical member 110. The method of fastening the support member 120 is not particularly limited.

Figure 8A:
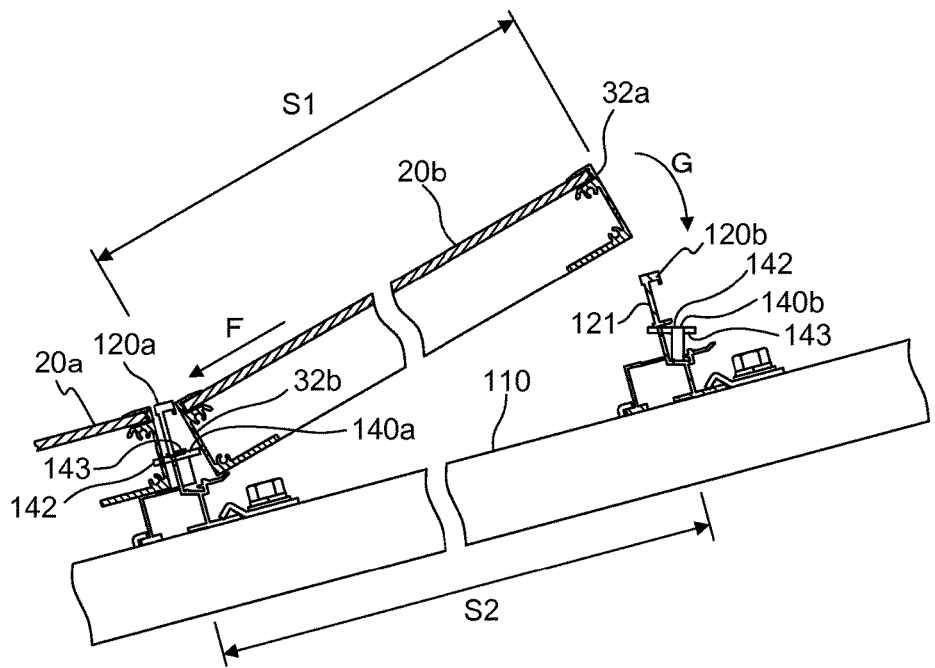
FIG. 8A is a cross-sectional view of a fastening system along the line VIII-VIII of FIG. 2 and shows the state before installation of the solar cell modules.
Figure 8B:
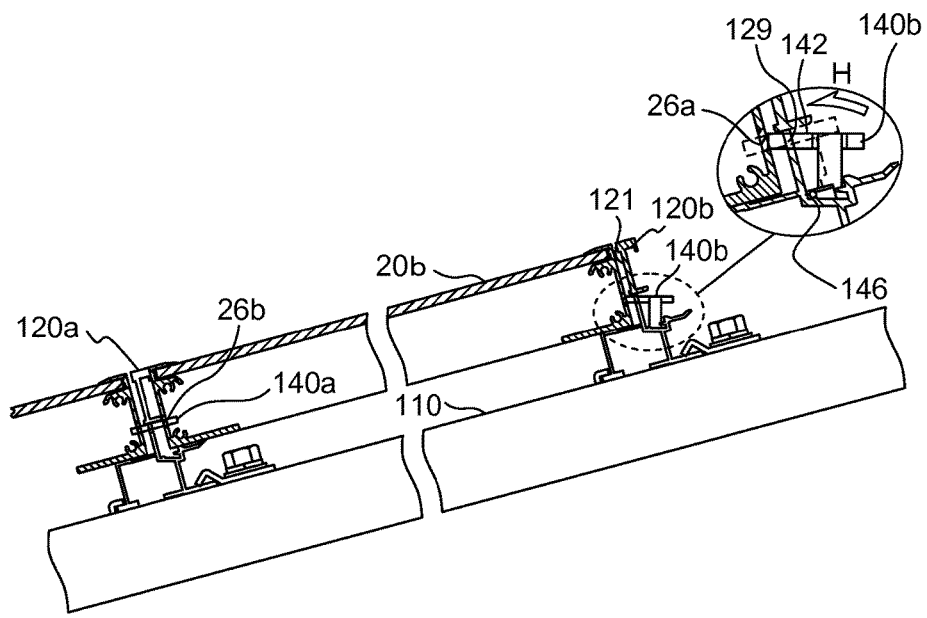
FIG. 8B is a cross-sectional view of a fastening system along the line VIII-VIII of FIG. 2 and shows the state where the solar cell modules are installed at the fastening system.

Referring to FIG. 8A and FIG. 8B, the method of installing solar cell modules 20 at a fastening system 100 according to the present embodiment will be explained.

FIG. 8A and FIG. 8B are cross-sectional views along the line VIII-VIII of FIG. 2, where FIG. 8A shows the state right before attachment of the solar cell module 20b to the fastening system 100 and FIG. 8B shows the state of placement of the solar cell module on the fastening system 100. The vertical member 110 is fastened to the installation surface 12, while the support members 120a, 120b are arranged in parallel with each other separated by about the same interval S2 as the length S1 of the solar cell module 20 in the vertical direction.

In FIG. 8A, the solar cell module 20a which is positioned at the inclined bottom side of the solar cell module 20b is already set. The fastening member 140a which is attached to the support member 120a is rotated from the state of placement which is shown in FIG. 5B to fasten the solar cell module 20a. At this time, the second engagement piece 143 of the fastening member 140a sticks out from the side part support part 121 of the support member 120a, so a worker moves the solar cell module 20b in the arrow F direction of the figure to insert the insertion hole 26b which is formed at the second side part 32b of the solar cell module 20b over the second engagement piece 143 so as to attach the second side part 32b.

Further, the second side part 32b of the solar cell module is attached to the support member 120a, then the worker lowers the first side part 32a of the solar cell module 20 in the arrow G direction of the figure and the first side part 32a is placed on the support member 120b as shown in FIG. 8B. At that time, the fastening member 140b which is attached to the support member 120b is inclined downward in state. The first engagement piece 142 does not stick out greatly from the side part support part 121 and the first side part 32a is not hooked, so the worker can just lower the first side part 32a of the solar cell module 20b in order to place the solar cell module 20 on the support member 120b. After placing it, the worker makes the fastening member 140b rotate in the illustrated arrow H direction, inserts the first engagement piece 142 in the through hole 129 and insertion hole 26a, and thereby fastens the solar cell module 20b. The solar cell module 20b is detached by making the fastening member 140b rotate in the opposite direction to the arrow H direction, pulling out the first engagement piece 142 from through hole 129 and insertion hole 26a to release the obstruction to movement of the solar cell module 20, and lifting up the first side part 32a of the solar cell module 20b. Further, the solar cell module 20b is detached so as to pull out the second engagement piece 143 which was inserted into the second side part 32b.

Figure 9A:
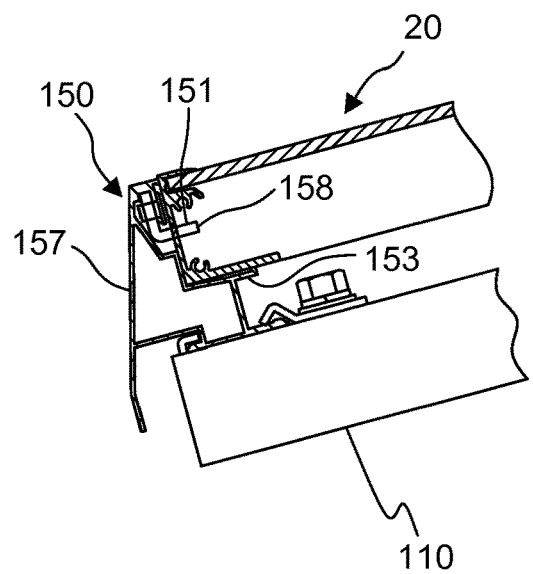
FIG. 9A is a cross-sectional view which shows a support member (start member) which is arranged at an inclined bottommost side.
Figure 9B:
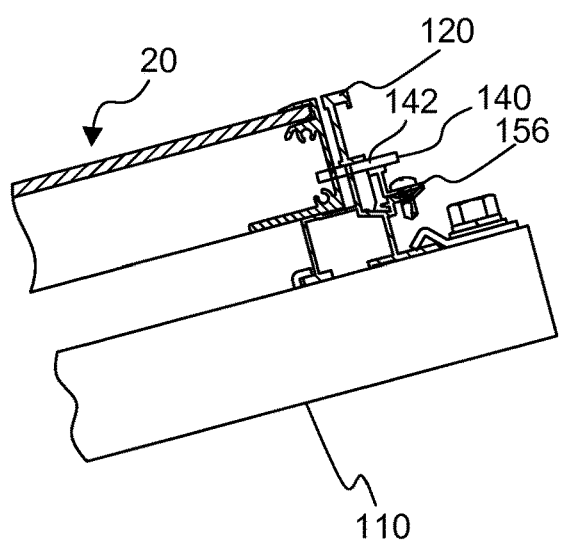
FIG. 9B is a cross-sectional view which shows a support member (end member) which is arranged at an inclined topmost side.

FIG. 9A is a cross-sectional view which shows a support member (start member 150) which is positioned at the inclined bottommost side (eave side) and shows the state of fastening of the second side part of the solar cell module 20. The start member 150 is positioned at the inclined bottommost side, so the first engagement piece 142 of the fastening member 140 is unnecessary. For this reason, the start member 150 has the fastening member 151 which has the engagement piece 158 which performs the role of the second engagement piece 143 attached to it. Further, the start member 150 is visible from a person under the roof, so, as illustrated, a decorative plate 157 is provided. FIG. 9B is a support member 120 (end member) which is positioned at the inclined topmost side (ridge side). Since it is positioned at the inclined topmost side, it is necessary to prevent the fastening member 140 from rotating and the first engagement piece 142 from being detached from the solar cell module 20. For this reason, the support member 120 which is illustrated has an anti-rotation member 156 which prevents rotation of the fastening member 140 attached to it by screwing. Note that, the start member 150 is provided so as to improve the aesthetic design of the fastening system 100. Instead of the start member 150, a support member 120 may also be set.

Figure 10:
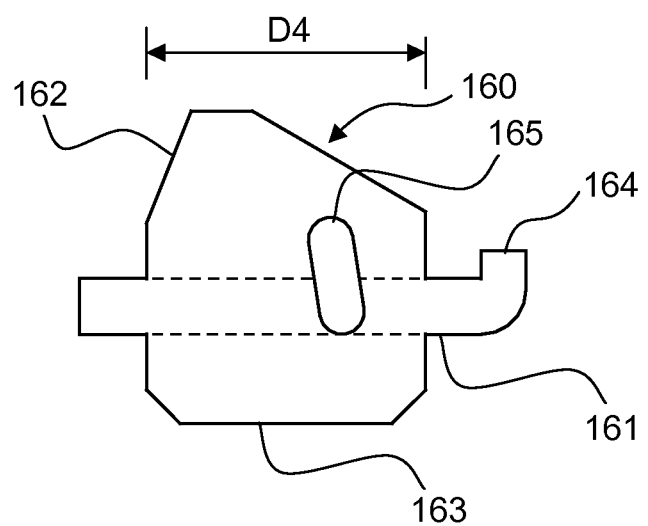
FIG. 10 is a plan view which shows another example of a fastening member.
Figure 11A:
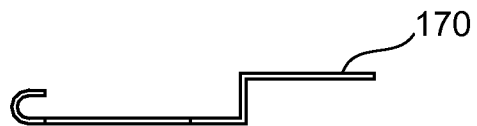
FIG. 11A is a plan view of a mounting member which attaches a fastening member which is shown in FIG. 10 to a support member.
Figure 11B:
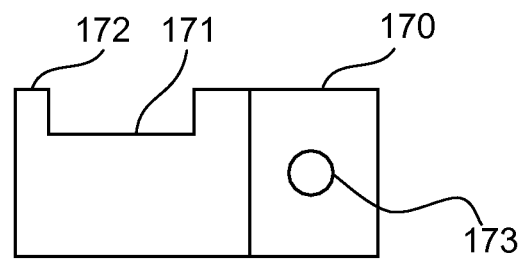
FIG. 11B is a side view of a mounting member which attaches a fastening member which is shown in FIG. 10 to a support member.
Figure 11C:
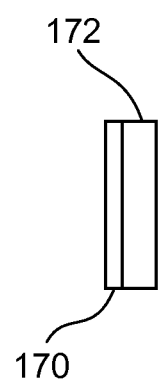
FIG. 11C is a front view of a mounting member which attaches a fastening member which is shown in FIG. 10 to a support member.
Figure 12:
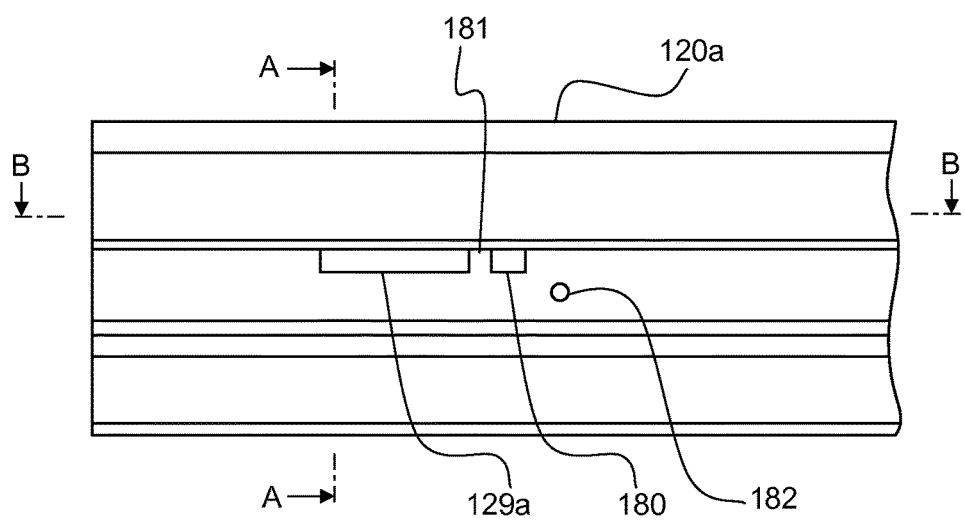
FIG. 12 is a front view which shows a support member for attaching a fastening member which is shown in FIG. 10.
Figure 13A:
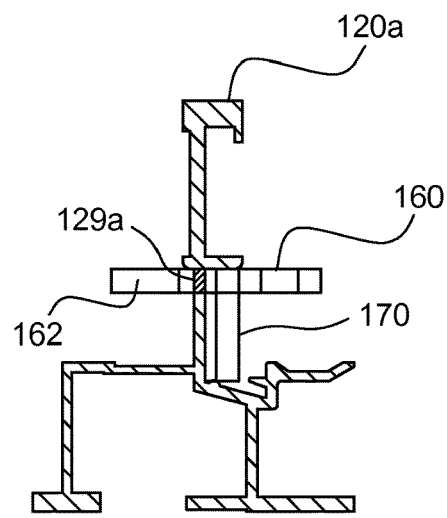
FIG. 13A is a view which shows the state of attachment of the fastening member which is shown in FIG. 10 to the support member and is a cross-sectional view along the line A-A of FIG. 12.
Figure 13B:
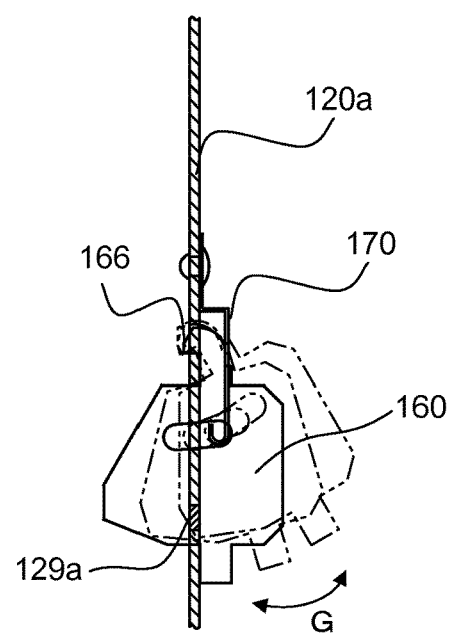
FIG. 13B is a cross-sectional view along the line B-B of FIG. 12.

FIG. 10 is a plan view which shows another example of a fastening member (fastening member 160). The fastening member 160, like the fastening member 140 which is shown in FIG. 7A to FIG. 7C, is provided with a fastening part body 161, a first engagement piece 162 which extends from one side part of the fastening part body 161, and a second engagement piece 163 which extends from the other side part which is positioned at the opposite side from the one side part. Further, the fastening member 160 has a hook part 164 which is provided at one end part of the fastening part body 161 and is attached to the support member 120 to be able to rotate about an axis vertical to the top surface of the solar cell module (rotation center axis 166) (see FIG. 13B). Further, the fastening member 160 is formed with a long hole 165. In the long hole 165, a projecting part 172 of a later explained mounting member 170 is inserted, whereby the range of rotation of the fastening member 160 is limited. The fastening member 160 is supported by the mounting member 170 which is shown in FIG. 11A to FIG. 11C and is attached to be able to rotate with respect to the support member 120a which is shown in FIG. 12. The mounting member 170 is provided with a support part 171 which abuts against the bottom of the fastening member 160 to support the fastening member 160, a screw hole 173 for fastening the mounting member 170 to the support member 120a, and a projecting part 172 which is inserted into an elongated hole 165 of the fastening member 160 and limits the range of rotation. Further, as shown in FIG. 12, the support member 120a is formed with a through hole 129a which passes through the first engagement piece 162, a hole 180 which catches the hook part 164, and a screw hole 182 which fastens the mounting member 170 to the support member 120. FIG. 13A and FIG. 13B shows the state of attachment of the fastening member 160 to the support member 120a. The fastening member 160, as shown in FIG. 13B, can rotate about the rotation center axis 166, pass through the through hole 129a to insert the first engagement piece 162 in the insertion hole 26a of the solar cell module 20, and thereby fasten the solar cell module 20.

Note that, in the present embodiment, the fastening members 140, 160 can be attached to rotate with respect to the support members 120, 120a. A worker makes them rotate to fasten solar cell modules 20. The method of movement of the fastening members is not limited to this. For example, the fastening members may be attached to support members which can move in the vertical direction with respect to the axis of the support members. Further, when fastening solar cell modules, a worker may directly insert the fastening members in the through holes of the support members.

Further, in the present embodiment, the installation surface 12 of the roof 10 may have a frame structure 101 comprised of a plurality of vertical members 110 attached to it to fasten the support members 120. By installing the vertical members 110, it is possible to eliminate the unevenness of the installation surface 12 to easily attach the support members 120. When there is no need to eliminate unevenness of the installation surface 12, it is also possible to not install the vertical members 110 and to directly attach the support members 120 to the installation surface 12. Further, the roof 10 which is shown in FIG. 1 is slanted, but the installation surface 12 may also be a flat roof surface which is not inclined. Further, it may also be the ground surface. The support members 120 of the present embodiment are arranged parallel to the ridge spur of the roof 10, but the invention is not limited to this. For example, they may also be installed vertical to the ridge spur of the roof 10. Further, in the present embodiment, a long shaped solar cell module 20 is arranged so that its long sides are supported by the support members 120, but it may also be arranged so that the short sides of the solar cell module 20 are supported by support members 120. Further, vertical members 110 or support members 120 of lengths longer than the long sides of the solar cell module 20 are used to fasten the solar cell module 20, but it is also possible to use a plurality of vertical members 110 or support members 120 shorter than the lengths of the sides of the solar cell module 20 to fasten the solar cell module 20 to the installation surface 12.

FIG. 14 is a perspective view which shows an example of installation of solar cell modules 20 other than at a roof. As shown in the figure, the solar cell modules 20 are fastened by support members 120 and a frame structure 102 which fastens them inclined. Further, the frame structure 102 is comprised of a plurality of vertical members 110 and iron support columns 103 which support the same. The support columns 103 are supported by concrete blocks 104 which are placed on the ground surface. The support columns 103 are preferably made of iron or made of steel from the viewpoint of strength, but may also be made of wood. In this way, it is also possible to form a structure made of an iron skeleton (frame structure 102) to form an installation surface instead of a roof. The frame structure 102 which is shown in FIG. 14 fastens the support members 120 using the vertical members 110, but it is also possible not to use vertical members 110, but to use the support columns 103 to directly support the support members 120. The support columns 103 are supported by concrete blocks 104, but it is also possible to drive the end parts of the support columns 103 directly into the ground to support the support columns 103. The installation surface which installs the solar cell modules 20 does not have to be inclined and may also be horizontal.

In the past, when installing solar cell modules 20, sometimes the work of fastening bolts etc. was necessary. Fastening bolts requires a tool, so when installing solar cell modules, there was the danger of the bolts or tool being mistakenly dropped and damaging the solar cell modules. If using the fastening system 100 of the present embodiment, it is possible to fasten the solar cell modules 20 without the work of fastening bolts at the time of attachment of the solar cell modules to the fastening system 100. Other than installing the fastening system on a roof, then fastening the support member which is positioned at the eave-most side (end member), it is possible to perform the work substantially without bolts, so the danger of bolts or tools being dropped and damaging the solar cell modules is reduced. Further, in the past, fasteners for clamping and fastening the solar cell modules separate from the horizontal members were separately used, but in the present invention, the support members and the fastening members are combined to fasten the solar cell modules, so it is possible to cut the number of parts and in turn possible to fasten the solar cell modules to the installation surface at a low cost.

Figure 15:
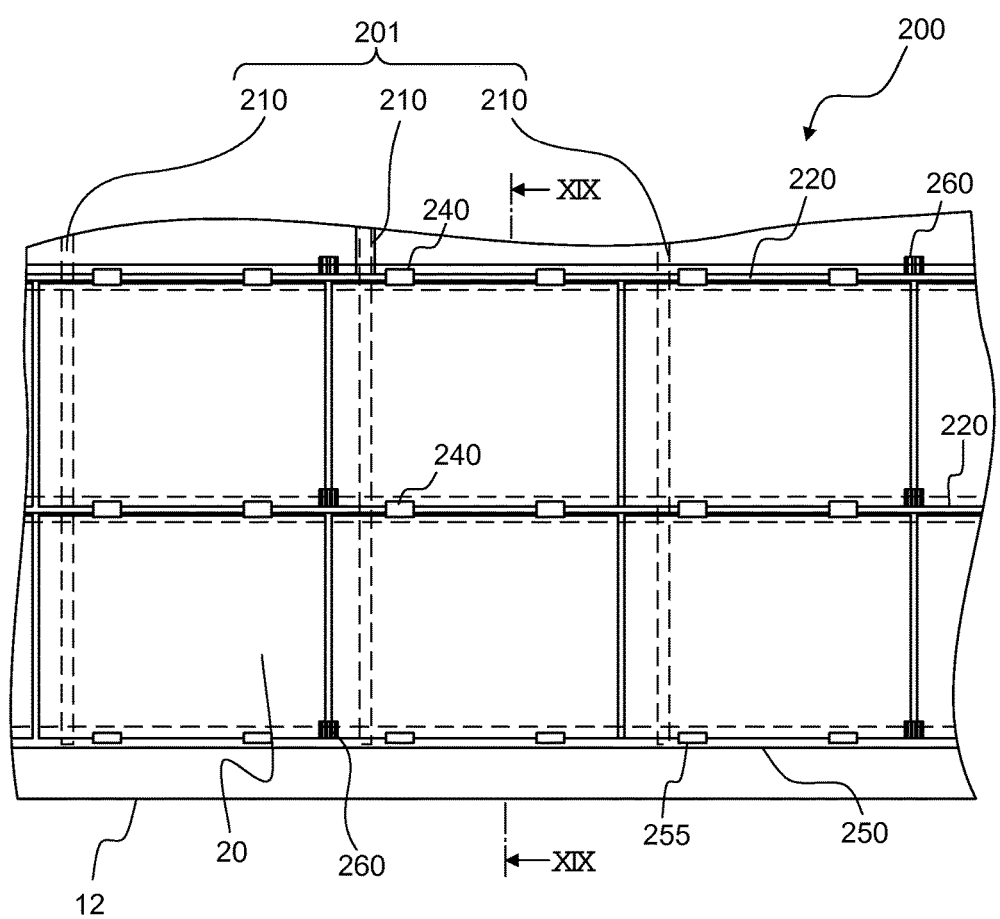
FIG. 15 is a plan view which shows a fastening system of solar cell modules according to a second embodiment of the present invention.

FIG. 15 is a plan view which shows the fastening system 200 for fastening solar cell modules according to a second embodiment of the present invention. The fastening system 200 of the present embodiment as well is a fastening system which is fastened to the installation surface 12 which is shown in FIG. 1 and is comprised of a frame structure 201 which is fastened to the installation surface 12, support members 220 which are arranged along the horizontal direction of the installation surface 12, and fastening members 240 which are attached to the support members 220 and fasten the solar cell modules 20. The frame structure 201 is comprised of narrow vertical members 210 which are arranged along the vertical direction of the installation surface 12 in parallel with each other.

The solar cell modules 20 and the frame structure 201 of the present embodiment and its vertical members 210 are similar to the solar cell modules 20 which are shown in FIG. 2 and the vertical members 110 of the first embodiment in configuration, so detailed explanations will be omitted. The support members 220 and the fastening members 240 which differ from the fastening system 100 of the first embodiment will mainly be explained.

Figure 16A:
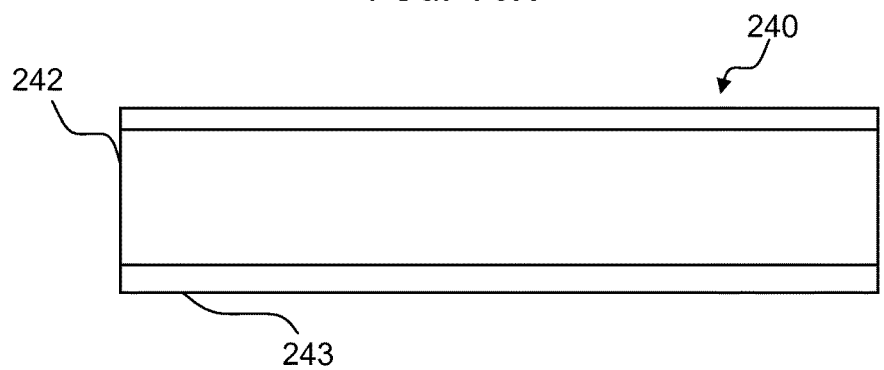
FIG. 16A is a plan view which shows a fastening member.
Figure 16B:
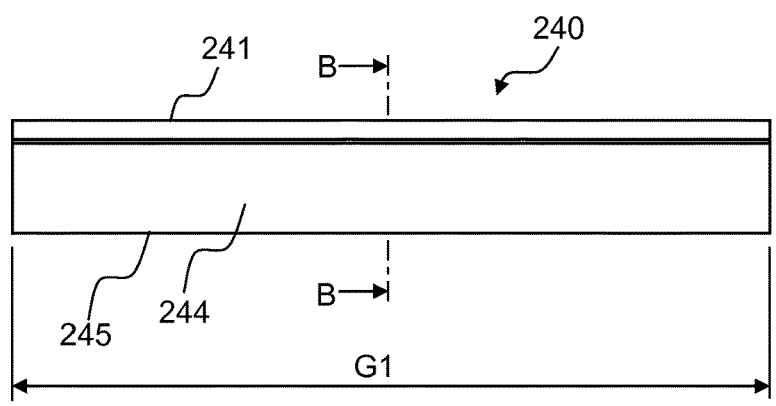
FIG. 16B is a front view which shows a fastening member.
Figure 16C:
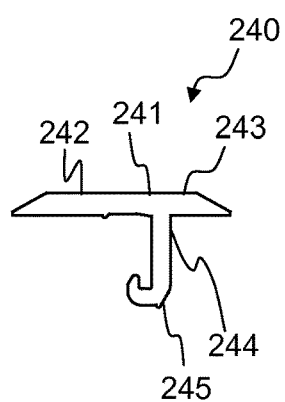
FIG. 16C is a cross-sectional view along the line B-B of FIG. 16B.

FIG. 16A to FIG. 16B are views which show a fastening member 240, where FIG. 16A is a plan view, FIG. 16B is a front view, and FIG. 16B is a cross-sectional view along the line B-B of FIG. 16B. The fastening member 240 is provided with a fastening part body 241 which has a first engagement piece 242 which abuts against the top surface of a solar cell module 20 at an inclined bottom side which is arranged across a support member 220 and a second engagement piece 243 which abuts against the top surface of a solar cell module 20 at an inclined top side. The fastening member 240 further has a leg part 244 which extends from the bottom surface of the fastening part body 241 downward. Further, the bottom end of the leg part 244 is formed with a hook part 245 which hooks on a support member 220. The fastening member 240 of the present embodiment prevents movement of the solar cell modules by the first engagement piece 242 and the second engagement piece 243 abutting against the top surfaces of the solar cell modules 20. For this reason, there is no need to form the insertion holes or through holes which were formed in the first embodiment.

Figure 17:
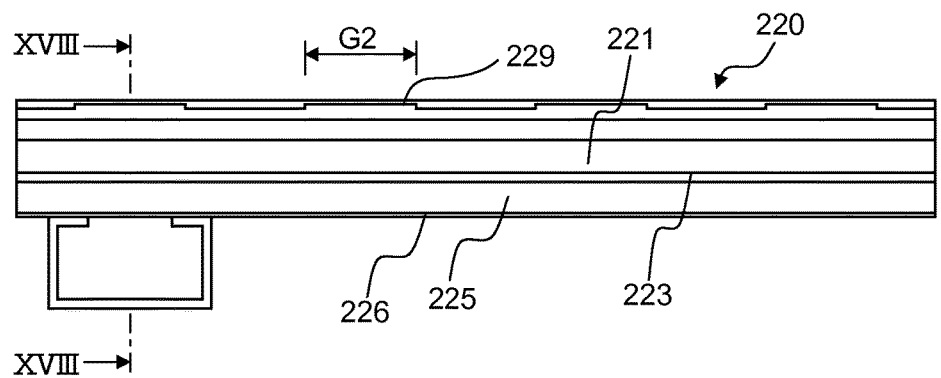
FIG. 17 is a front view of a support member.
Figure 18:
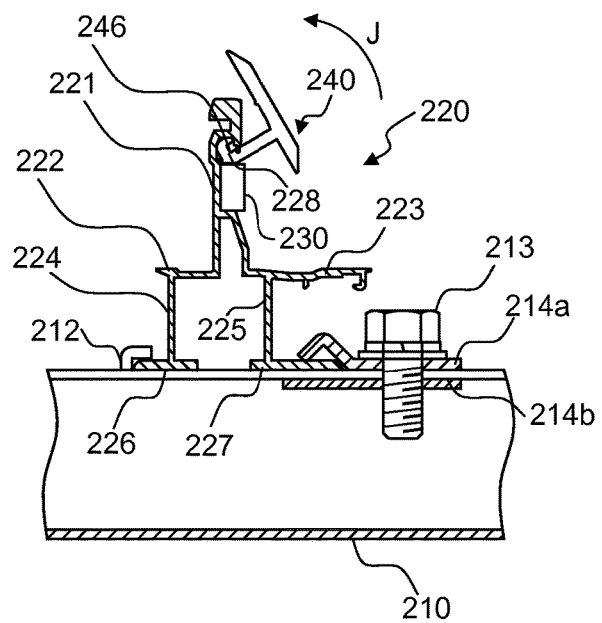
FIG. 18 is a cross-sectional view of a support member along the line XVIII-XVIII of FIG. 17 and shows the state of attachment of the fastening member and installation at the frame structure.

FIG. 17 is a front view of a support member 220, while FIG. 18 is a cross-sectional view of the support member 220 along the line XVIII-XVIII of FIG. 17 and shows the support member 220 in the state fastened to a vertical member 210 and having a fastening member 240 attached to it. The support member 220, like the support member 120 of the first embodiment, is provided with a first bottom surface support part 222 which supports the bottom surface of a solar cell module 20 which is positioned at an inclined bottom side among solar cell modules 20 which adjoin each other in the vertical direction and a second bottom surface support part 223 which supports the bottom surface of a solar cell module 20 which is positioned at the inclined top side. Further, the support member 220 is provided with a side part support part 221 which supports the second side part of the solar cell module at the inclined top side when arranged between solar cell modules 20 which adjoin each other in the vertical direction. The support member 220 has a standing part 224 which supports the first bottom surface support part 222 and a standing part 225 which supports the second bottom surface support part 223. At the bottom end parts of the standing part 224 and the standing part 225, bottom surface parts 226, 227 are provided. Further, the bottom surface part 226 is hooked at the hook part 212 of the vertical member 210 and the bottom surface part 227 and the top surface of the vertical member 210 are clamped by the clamping members 214a, 214b and fastened by bolts 213, whereby the support member 220 is fastened to the vertical member 210.

The support member 220, as shown in FIG. 18, is formed with a groove part 228 in which the bottom end (hook part 245) of the leg part 244 of the fastening member 240 is inserted at the side part support part 221 against which the second side part 32b of the solar cell module 20 abuts. The groove part 228 is formed along the longitudinal direction of the support member 220. By insertion of the hook part 245 into the groove part 228 and engagement of the hook part 245 at the inside of the groove part 228, the fastening member 240 is attached to the support member 220 to be able to rotate about the hook part 245 (rotation center axis 246). The rotation of the support member 220 rotates about the rotation center axis 246 which is parallel to the longitudinal direction of the support member 220 and parallel to the first side part 32a and the second side part 32b of the solar cell module 20. Further, as shown in FIG. 17, the side part support part 221 of the support member 220 is formed with a cutaway part 229 in which the fastening member 240 fits at the position of attachment of the fastening member 240. The width G2 of the cutaway part 229 is formed to a size the same as the width G1 of the fastening member 240. By fitting the leg part 244 of the fastening member 240 in the cutaway part 229, the fastening member 240 prevents movement to the horizontal direction (longitudinal direction of support member 220). Further, as shown in FIG. 18, an anti-detachment member 230 which prevents the fastening member 240 from being detached from the cutaway part 229 may be attached to the side part support part 221. The anti-detachment member 230 for example is attached to the side part support part 221 after the leg part 244 of the fastening member 240 is fit into the cutaway part 229, whereby the anti-detachment member 230 supports the bottom end of the leg part 244. Due to this, the fastening member 240 becomes harder to rotate about the hook part 245, while the anti-detachment member 230 prevents detachment of the fastening member 240 from the cutaway part 229.

Figure 19:
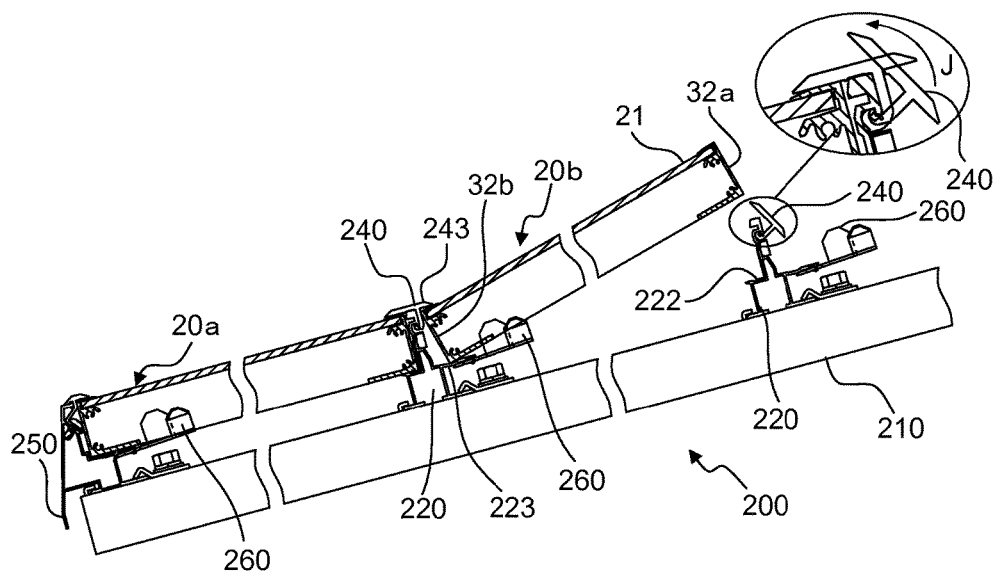
FIG. 19 is a cross-sectional view of a fastening system along the line XIX-XIX of FIG. 15 and shows the state right before installation of the solar cell modules.

As shown in FIG. 19, when attaching the solar cell module 20b which is positioned at the inclined top side at the fastening system 200, the second side part 32b of the solar cell module 20b is inserted between the second bottom surface support part 223 of the support member 220 and the second engagement piece 243 of the fastening member 240. Further, in the state with the fastening member 240 of the support member 220 laid down, the first side part 32a of the solar cell module 20b is placed on the first bottom surface support part 222 of the support member 220. After placing it, the worker makes the fastening member 240 rotate in the arrow J-direction, makes it abut against the top surface 21 of the solar cell module 20b, and thereby prevents movement of the solar cell module 20b in the top direction.

If installing the solar cell module 20b, the solar cell module 20b is inserted in the fastening member 240 which fastens the solar cell module 20a of the inclined bottom side, whereby rotation of the fastening member 240 is stopped by the second side part 32b of the solar cell module 20b and the solar cell module 20a is prevented from becoming unfastened.

Figure 20A:
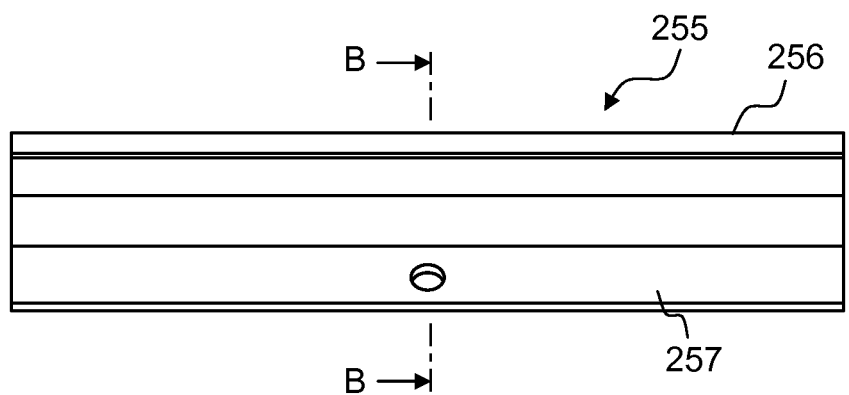
FIG. 20A is a front view which shows a fastening member which is attached to a support member (start member) which is installed at an inclined bottommost side.
Figure 20B:
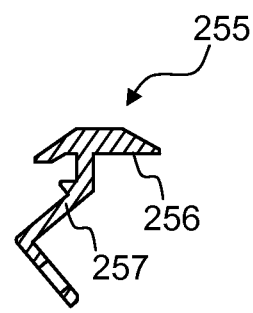
FIG. 20B is a cross-sectional view along the line B-B of FIG. 20A.
Figure 21:
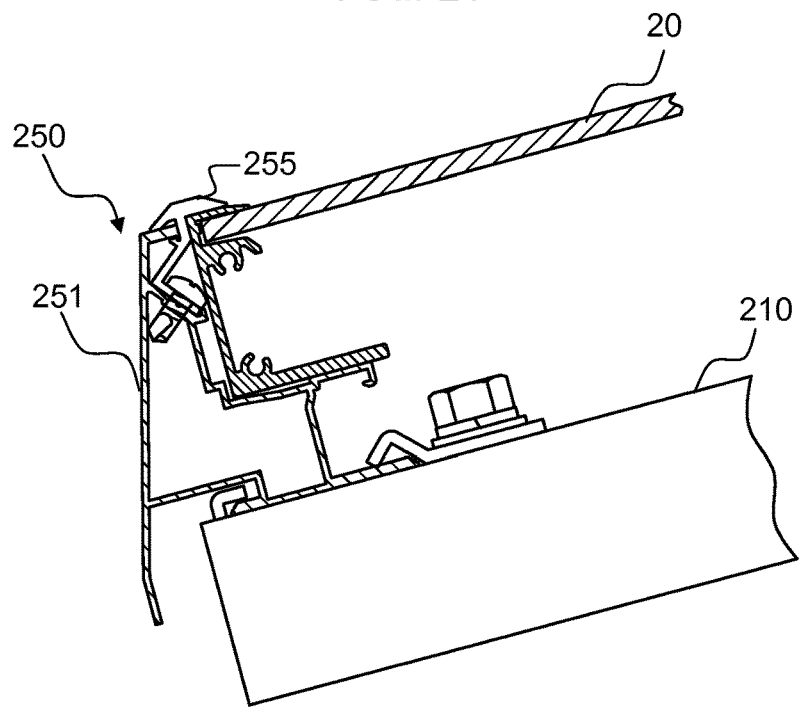
FIG. 21 is a cross-sectional view of a start member which shows the state of installation of a solar cell module.

In the fastening system 200 of the present embodiment, the support member which is positioned at the inclined bottommost side (eave edge side) (start member 250) and the fastening member 255 which is attached to it will be explained. FIG. 20A and FIG. 20B are views which show the fastening member 255 which is attached to the start member 250, where FIG. 20A is a front view and FIG. 20B is a cross-sectional view along the line B-B of FIG. 20A. FIG. 21 is a cross-sectional view which shows the start member 250 and shows the state where it is fastened to a vertical member 210 and fastens a solar cell module 20. The start member 250 is positioned at the inclined bottommost side in the fastening system 200, so, as shown in FIG. 21, fastens only a solar cell module 20 which is positioned at the inclined top side. For that reason, the fastening member 255 which is shown in FIG. 20A and FIG. 20B is provided with the second engagement piece 256 which abuts against the top surface of the solar cell module 20 which is positioned at the inclined top side and a leg part 257 which extends from the second engagement piece 256 downward and is fastened at the start member 250. Further, the fastening member 255, as shown in FIG. 21, is fastened by screwing to the start member 250. Further, the start member 250 has a decorative plate 251.

Figure 22:
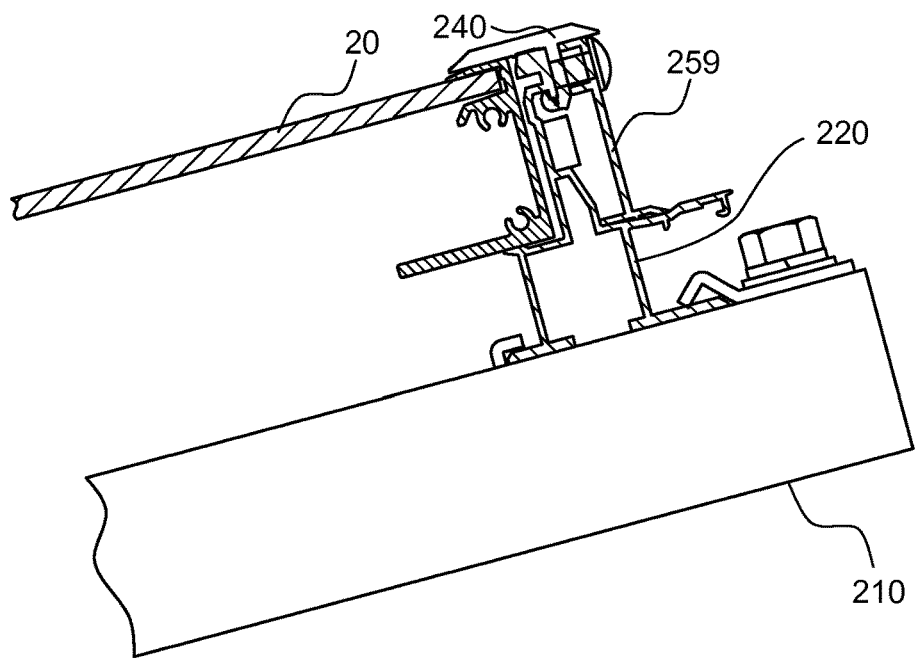
FIG. 22 is a cross-sectional view which shows a support member (end member) which is arranged at an inclined topmost side.

The support member 220 which is positioned at the inclined topmost side (ridge side) in the fastening system 200 (end member) will be explained. FIG. 22 is a cross-sectional view which shows an end member 220. In the end member 220, only the solar cell module 20 which is positioned at the inclined bottom side is fastened. Like with the support member 220 which is shown in FIG. 19, the second side part 32b of the solar cell module 20b of the inclined top side is used to stop rotation of the fastening member 240, so the end member 220, as shown in FIG. 22, fastens the solar cell module 20, then the anti-rotation member 259 which prevents rotation of the fastening member 240 is attached to the end member 220.

Further, in the fastening system of the present embodiment 200, the fastening member 240 abuts against the top surface of the solar cell module 20 to prevent movement in the top direction, but movement of the solar cell module in the horizontal direction (longitudinal direction of support member and longitudinal direction of first side part and second side part of solar cell module 20) is not prevented. For this reason, for example, it is also possible to attach the anti-movement member 260 which is shown in FIG. 23A to FIG. 23C between solar cell modules 20 which are arranged adjoining each other in the horizontal direction and fasten the anti-movement member 260 to the support member 220 to thereby prevent movement of the solar cell module 20 in the horizontal direction.

Figure 23A:
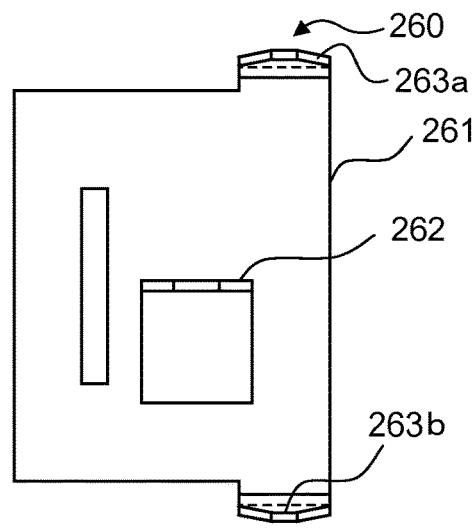
FIG. 23A is a plan view of an anti-movement member.
Figure 23B:
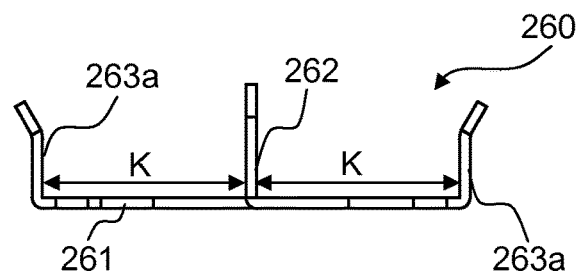
FIG. 23B is a front view of an anti-movement member.
Figure 23C:
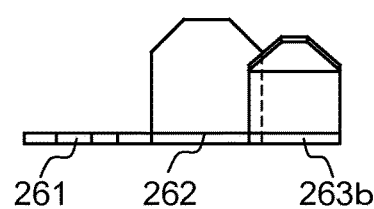
FIG. 23C is a side view of an anti-movement member.
Figure 24:
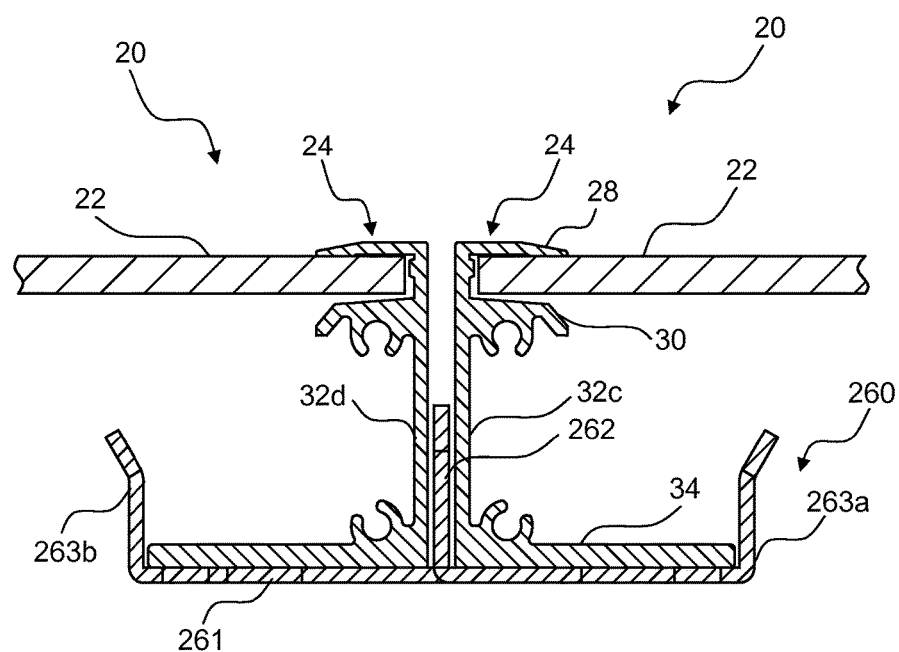
FIG. 24 is a cross-sectional view which shows the state of attachment of anti-movement members to solar cell modules.

FIG. 23A to FIG. 23C are views which show an anti-movement member 260, where FIG. 23A is a plan view, FIG. 23B is a front view, and FIG. 23C is a side view. Further, FIG. 24 is a cross-sectional view which shows the state of attachment of the anti-movement member 260 between solar cell modules 20 which adjoin each other in the horizontal direction. The anti-movement member 260 is fabricated by working sheet metal. The anti-movement member 260 is provided with a sheet 261, a standing part 262 which stands at the center of the sheet 261 and is sandwiched between solar cell modules 20 which adjoin each other in the horizontal direction, and bent parts 263a, 263b which are provided at the two side parts of the sheet 261. The bent parts 263a, 263b are fabricated so that the distances K from the standing part 262 match the widths of the base parts 34 of the frames 24 of the solar cell modules 20 (see FIG. 24). The anti-movement member 260, as shown in FIG. 15, can prevent movement in the horizontal direction if attached to either the left side parts or right side parts of the solar cell modules 20. There is no need for attachment to the two side parts of the solar cell modules 20. Further, the anti-movement member 260 is one example of prevention of movement of the solar cell modules in the horizontal direction. For example, it is also possible to form insertion holes in the solar cell modules and insert pins from the support members so as to prevent movement of the solar cell modules in the horizontal direction. The method of preventing movement in the horizontal direction is not particularly limited.

Above, a fastening system of solar cell modules according to the present embodiment was explained using the drawings. If using the fastening system 200 of the present embodiment, it is possible to install the fastening system 200 on a roof, then fasten it to the end members. Other than that, the work can be performed without bolts. Further, in the past, the fasteners for fastening the solar cell modules to the horizontal members by clamping the solar cell modules were separatedly provided, but in the fastening system of the present embodiment, the support members and the fastening members are combined to fasten the solar cell modules, so it is possible to cut the number of parts and in turn it is possible to install the solar cell modules on a roof at a low cost. Note that, in the same way as the first embodiment, in the present embodiment, solar cell modules which were installed by the fastening system 200 on the roof 10 was shown, but it is also possible to support the vertical members 210 of the frame structure 201 by for example the support columns 103 which are shown in FIG. 14 and thereby fasten the solar cell modules 20 at a slant on the installation surface of a flat roof surface or ground surface etc. That is, the configuration of the frame structure 201 of the fastening system 200 is not limited to this. It is also possible to omit the vertical members 210 and directly attach the support members 220 to the installation surface 12 and possible to attach the support columns 103 to the support members 220 and slant the solar cell module 20. Further, it is also possible to provide pins which project from the support members between adjoining solar cell modules to prevent movement in the horizontal direction.

DESCRIPTION OF REFERENCE SIGNS 10. roof
12. installation surface
20, 20a, 20b. solar cell modules
21. top surface
22. bottom surface
23. solar cell substrate
24. frame
26. 26a, 26b. insertion holes
28. top surface side clamping part
30. bottom surface side clamping part
32. side part
32a. first side part
32b. second side part
32c. left side part
32d. right side part
34. base part
100, 200. fastening system
101, 201. frame structures
103. support column
104. concrete block
110, 210. vertical members
111. slit
112. hook part
114a, 114b. clamping member
120, 220. horizontal member
121, 221. side part support parts
122, 222. first bottom surface support parts
123, 223. second bottom surface support parts
124, 125. 224, 225. standing parts
126, 127, 226, 227. bottom surface parts
128, 228. groove parts
129. through hole
140, 160, 240. fastening members
141, 161, 241. fastening part bodies
142, 162, 242. first engagement pieces
143, 163, 243. second engagement pieces
144a, 144b, 244. leg parts
145a, 145b. bent parts
146, 166, 246. rotation center axes
150, 250. start members
151, 255. fastening members
156. anti-rotation member
157, 251. cosmetic plates
158. engagement piece
170. mounting member
229. cutaway part
230. anti-detachment member
245. hook part
259. anti-rotation member
260. anti-movement member

The invention claimed is:

1. A fastening system which fastens solar cell modules to an installation surface, each said solar cell module having a top surface at which a solar cell substrate is provided, a bottom surface opposite to said top surface, a first side part, and a second side part opposite to said first side part, wherein said first side part and said second side part are located at corresponding ends of the solar cell substrate, said fastening system comprising:

a plurality of support members which abut directly against said first side parts or said second side parts of said solar cell modules, said plurality of support members supporting said bottom surfaces, said first side parts, and said second side parts of said solar cell modules, the first side parts and the second side parts being side surfaces of the solar cell modules that are vertical with respect to the top surfaces of the solar cell modules, and fastening members which prevent at least vertical movement of said solar cell modules with respect to said top surfaces, said fastening members being movably attached to said plurality of support members so that locking against movement of said solar cell modules can be released, wherein each of the fastening members comprises a fastening part body which abuts directly against the top surface of a corresponding solar cell module to prevent movement of the solar cell module, a leg part which extends from an abutting surface of the fastening body part, which abuts directly against the top surface of the solar cell module, in a direction crossing the abutting surface, and a hook part which is placed at a bottom end of the leg part and hooks on a corresponding support member, wherein each of the support members has a groove part which is formed along a longitudinal direction of the support member, and each of the fastening members is attached to a corresponding support member so as to have a rotation axis around which said each of the fastening members rotates by insertion of the hook part into the groove part and engagement of the hook part at an inside of the groove part, the rotation axis being parallel to the first side part or the second side part of the corresponding solar cell module, with which said each of the fastening members engages, wherein the fastening part body, the leg part and the hook part are portions of one single component, and the support member and the fastening member are separate components, and wherein the fastening part body comes in contact with the top surface of the solar cell module or moves away from the top surface of the solar cell module by rotation of the fastening member.

2. The fastening system of claim 1, further comprising anti-movement members which are attached to said support members and prevent movement parallel to said first side parts and said second side parts of said solar cell modules.

3. The fastening system of claim 1 which fastens a plurality of said solar cell modules which are arranged consecutively, wherein said support members support said bottom surfaces of said solar cell modules which adjoin each other across said support members and one said first side part and another said second side part among said adjoining solar cell modules, and said fastening members prevent movement of both adjoining solar cell modules in a vertical direction with respect to the top surfaces of said solar cell modules, wherein each of said fastening members is provided with the fastening part body comprising a first engagement piece which abuts directly against the top surface of one of said solar cell modules which adjoin each other across said support members and comprising a second engagement piece which abuts directly against the other top surface.

4. The fastening system of claim 1, further comprising a frame structure which fastens said plurality of support members to said installation surface.

* * * * *